C. C. CHRISTOPHER, G. L. KEITH, J. E. ALLSTEADT, E. D. EINSEL & C. G. PELANDER.
CORN CRIB.
APPLICATION FILED NOV. 21, 1916.
1,268,435.
Patented June 4, 1918.
4 SHEETS—SHEET 1.
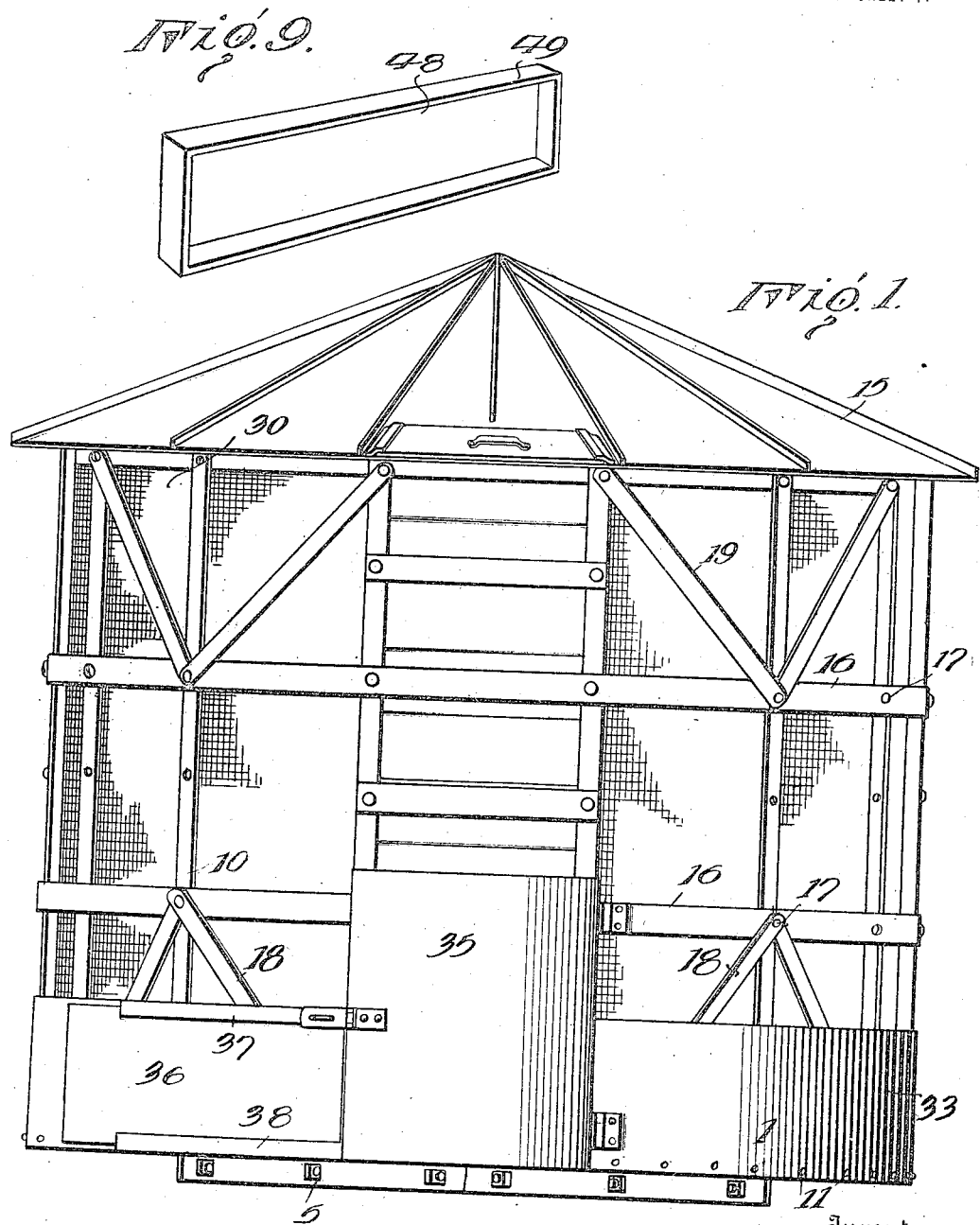

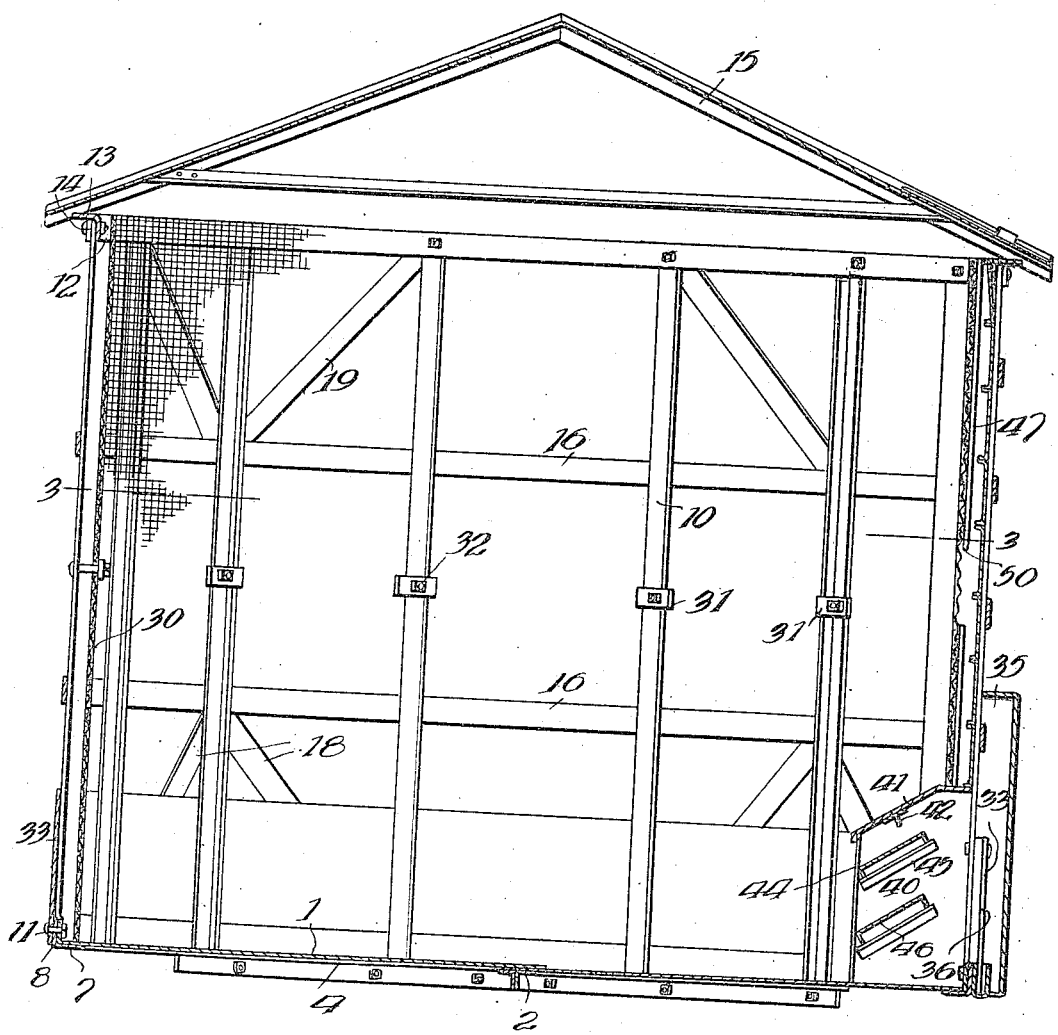

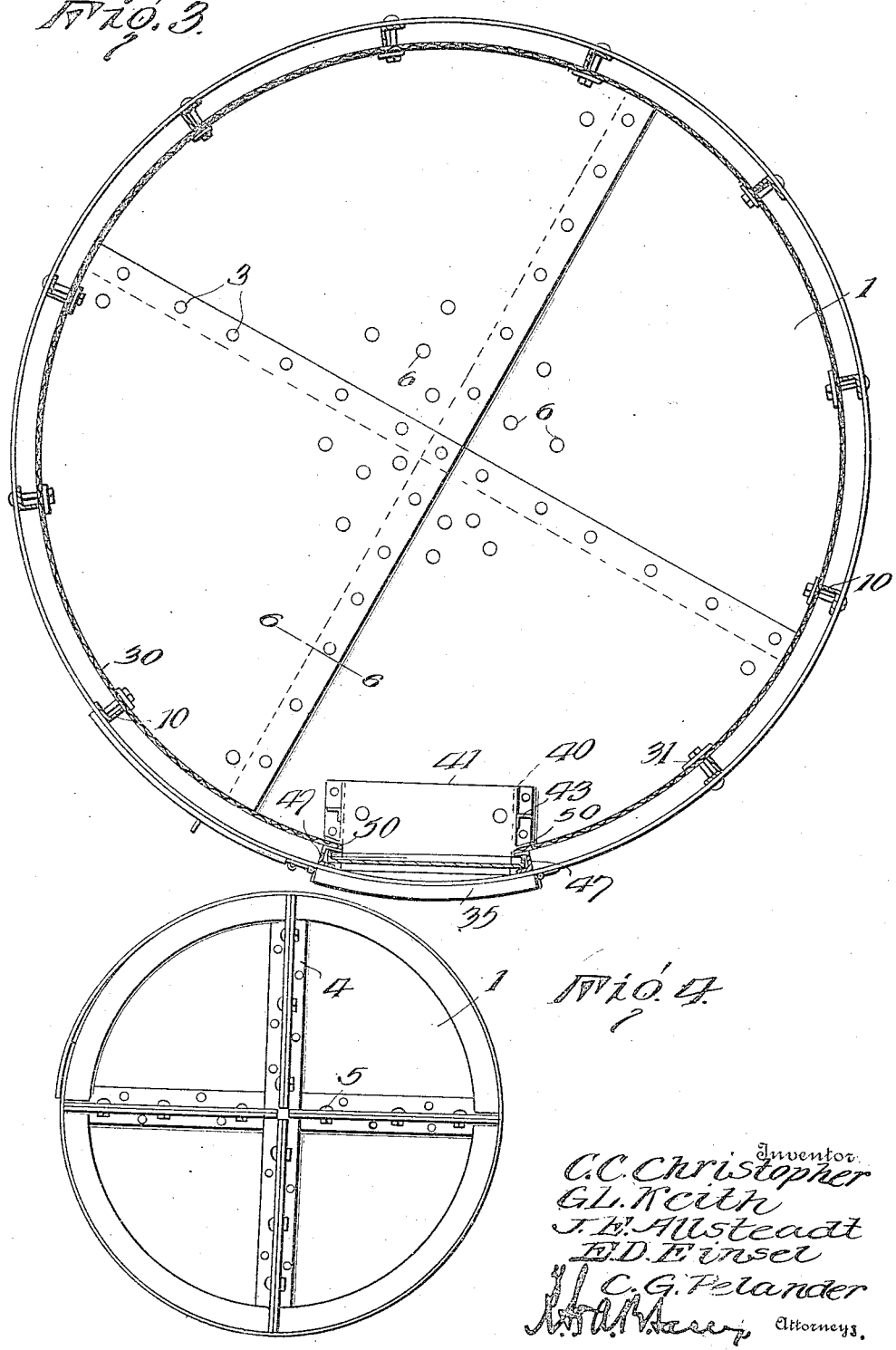

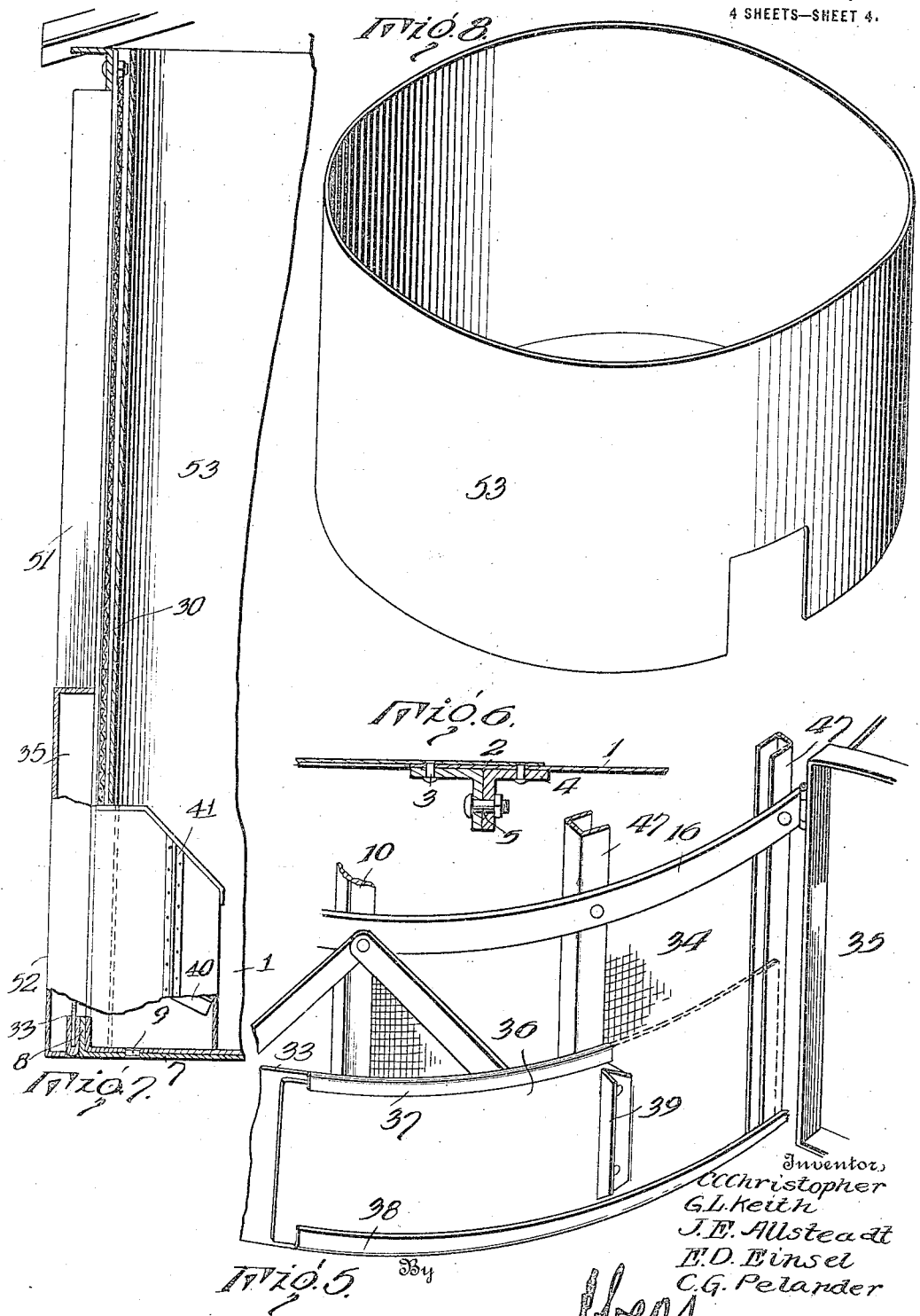

UNITED STATES PATENT OFFICE.

COLUMBUS C. CHRISTOPHER, GILBERT L. KEITH, JOHN E. ALLSTEADT, AND EPHRAIM D. EINSEL, OF HASTINGS, AND CHARLES G. PELANDER, OF HOLDREGE, NEBRASKA, ASSIGNORS TO HASTINGS EQUITY GRAIN BIN MANUFACTURING CO., OF HASTINGS, NEBRASKA.

CORN-CRIB.

1,268,435.   Specification of Letters Patent.   Patented June 4, 1918.

Application filed November 21, 1916.  Serial No. 132,703.

*To all whom it may concern:*

Be it known that we, COLUMBUS C. CHRISTOPHER, GILBERT L. KEITH, JOHN E. ALLSTEADT, and EPHRAIM D. EINSEL, of Hasting, in the county of Adams and State of Nebraska, and CHARLES G. PELANDER, of Holdrege, county of Phelps, and State of Nebraska, citizens of the United States, have invented certain new and useful Improvements in Corn-Cribs, of which the following is a specification.

This invention relates to corn cribs and has as one of its objects to provide a corn crib which may be readily and conveniently transported either in set up condition or knocked down and which in its set up condition will be substantial and not liable to sag, bulge or become otherwise distorted.

Another aim of the invention is to provide a corn crib so constructed that the door thereof may be opened for the removal of the corn without likelihood of corn wasting through the doorway, the means provided for preventing such waste being, however, so constructed and arranged as to permit of the corn being readily shoveled from the crib through the said doorway.

Another aim of the invention is to provide a corn crib which will be rat and mouse proof and incidentally the invention contemplates the provision of means for preventing the entrance of rats and mice into the crib even when the door thereof is open and the crib is left unattended.

Another aim of the invention is to provide in a corn crib, a frame structure rendering the crib rigid and substantial when set up and in use and capable of having its component parts readily assembled and disassembled.

Another aim of the invention is to provide a sheet metal corn crib having its floor so constructed as to permit of corn being readily shoveled thereover although the said floor is made up of sections.

Another aim of the invention is to provide in a corn crib of this general type a novel arrangement of closure plates and means for supporting the plates, which means is so constructed as to permit of the closure plates being readily dropped into place as the crib is being filled.

In the accompanying drawings:

Figure 1 is a front elevation of the corn crib embodying the present invention.

Fig. 2 is a vertical sectional view therethrough.

Fig. 3 is a horizontal sectional view on the line 3—3 of Fig. 2.

Fig. 4 is a bottom plan view of the crib.

Fig. 5 is a fragmentary perspective view of that portion of the crib at and adjacent the doorway.

Fig. 6 is a vertical transverse sectional view on the line 6—6 of Fig. 3.

Fig. 7 is a vertical sectional view illustrating a modified form of the invention.

Fig. 8 is a perspective view of a wall member which is to be employed when the crib is to be only temporarily in use.

Fig. 9 is a perspective view of one of the closure plates for the crib.

The floor of the crib embodying the present invention is formed from sheet metal and preferably in sections of segmental form and these sections are indicated in the drawings by the numeral 1. The floor sections 1 are arranged with their edges overlapping as indicated by the numeral 2 and rivets or other suitable securing elements 3 are driven through the overlapped edges of the said sections, the rivets preferably having flat heads at the upper surface of the floor so as to not interfere with shoveling of the grain over the said floor. Furthermore, it will be understood that by overlapping the edges of the floor sections a shovel may be passed over the floor surface without interference.

In order to brace the floor sections at their overlapped edge portions a series of radial braces is provided, as shown in Fig. 4 of the drawings, and these braces are arranged in pairs and are of L-angle iron construction and are disposed with their horizontal wings 4 bearing against the under sides of the sections at their overlapped edges and secured in place by means of the rivets or other fastening elements 3 previously described. As stated, the angle iron braces are arranged in pairs and the vertical wings of the braces of each pair are disposed in contact with each other, as shown most clearly in Fig. 6 of the drawings, and bolts or other suitable fastening means, indicated by the numeral 5, are secured through these said wings. Of course, if desired, T-angle irons may be employed instead of L-angle irons and arranged substantially in the manner above described and as shown in the said Fig. 6. The pairs of braces comprising the series meet at their inner ends at the center of the floor and at their other ends terminate substantially at the outer peripheries of the floor sections or, in other words, at the arcuate edges of the said sections. At this point it may be stated that while the crib is here shown as cylindrical in contour, it may be rectangular or of some other shape, if desired. It will further be understood at this point that the lower edges of the vertical wings of the angle iron braces rest upon the ground surface when the crib is set up and serve to space the floor of the crib from the said ground surface, and in order that rain and melted snow may drain from the crib it is preferable that the floor of the crib be provided with a number of openings, indicated by the numeral 6. In order to brace the floor sections at their outer or arcuate edges, arcuate L-angle irons are disposed with their horizontal wings 7 extending beneath the under sides of the said floor sections at their said outer edges and the vertical wings 8 of these angle iron sections extend above the plane of the said floor and serve a purpose to be presently explained. Rivets or other suitable securing elements 9 are secured through the wings 7 of the angle iron sections and through the peripheral portions of the floor sections and it is preferable that the ends of the said wings 7 extend beneath the horizontal wings 4 of the radial braces heretofore described and that they abut against the vertical wings of the said braces, as clearly shown in Fig. 4 of the drawings.

The wall of the crib is preferably foraminous and in the present instance is illustrated as of wire mesh material and the said wall is supported and braced by a frame structure which will now be described. In that form of the invention shown in Figs. 1 to 5 inclusive, the frame structure includes a number of uprights indicated by the numeral 10 and these uprights are preferably of L-angle iron construction and rest at their lower ends upon the upper surface of the floor of the crib, as shown in Fig. 2 of the drawings, and are secured to the flanges 8 of the angle iron bracing sections 7 by means of bolts or other suitable fastening devices 11. In this form of the invention one wing of each angle iron upright has its edge presented toward the interior of the crib. The wings just mentioned are cut away as indicated by the numeral 12 so that the other wing of each upright will project in a manner to permit of an annular top member 13 being secured thereto by means of bolts or other suitable fastening devices 14. The top member 13 is, as stated, annular in form and may be integral throughout and continuous or made up of a number of sections, and it is preferable that the said member be of L-angle iron construction, the vertical wing thereof being, of course, secured by means of the bolts 14 and the other wing extending horizontally to afford a support for the roof 15 of the crib, which roof, as it is of the ordinary construction, requires no detailed description.

In order to relatively brace the uprights and prevent bulging of the crib as it is filled with corn, annular hoops 16 are disposed to surround the frame of the crib and are secured by means of bolts or other suitable fastening devices 17 to the outer wings of the said uprights. These hoops are, of course, arranged horizontally and any desired number may be employed. To further brace the frame structure, pairs of diagonal braces 18 are provided and are secured at their upper ends in overlapped relation by means of the bolts 17 and the said braces of each pair extend downwardly in diverged relation and are secured at their lower ends to the upstanding or vertical wings 8 of the angle iron sections which brace the peripheral portions of the floor sections. Similar pairs of braces 19 are secured at their lower ends by means of the bolts 17 to the uppermost one of the hoops of the frame and extend upwardly in diverging relation and are secured at their lower ends to the vertical wing of the top member 13 of the said frame.

The foraminous wall of the crib is indicated by the numeral 30 and this wall is, of course, cylindrical in form and is disposed within the frame above described and in position contacting the inwardly presented edges of the wings of the uprights 10, as clearly shown in Fig. 3 of the drawings. In order to brace the wall and secure the same in upright position and against collapse, plates 31 are disposed against the inner side of the wall at intervals and bolts or other suitable fastening elements are secured through the said plates and through the uprights 10. It will be understood, of course, that when the bolts are tightened the plates will bear outwardly against the wall and serve to hold the same snugly in place against the said inwardly presented edges of the uprights.

In order to render the crib rat and mouse proof, an annular sheet metal guard 33 is disposed to surround the lower portion of the crib and is secured by means of the bolts 11 previously described, to the outer side of the upstanding wings 8 of the angle iron sections which brace the peripheries of the floor sections. This guard may be formed in sections or may be continuous, as desired, and the same terminates at its ends at the opposite sides of the door opening of the crib. This door opening is indicated in general by the numeral 34 and hinged to the frame structure at one side of the door opening is a door 35 which is preferably of sheet metal and which in itself may be of any desired construction, it being in any event, however, so constructed and mounted that when closed there will be no likelihood of rats or mice entering the crib through the said door opening.

In order that the lower portion of the doorway may be closed when the door is in open position and the crib is to be left unattended for any length of time, and to prevent rats and mice entering the crib through the said doorway, a sheet metal door 36 is slidably fitted at its upper and lower edges in channeled guides 37 and 38 extending respectively at the upper and lower edges of the guard 33 at one side of the doorway 34, and the door may be slid from the full line position shown in Fig. 5 of the drawings, in which position it is open, to the dotted line position shown in the said figure, in order to close the lower portion of the doorway 34, for the purpose stated. The door 36 is, of course, curved from end to end so as to conform to the curvature of the guard 33 and is of substantially the same height as the said guard, the guard being in turn of a sufficient height to insure against rats or mice jumping over the same. In order that the door 36 may be conveniently slid from open to closed position and vice versa, the door is provided upon its outer face at its end which is next adjacent the doorway with an outstanding flange, indicated by the numeral 39, and when the door 36 is in open position and the door 35 is in closed position, the flange 39 will lie close to the free edge of the door and in this manner serve to close any space which otherwise might exist between the said edge of the door and the corresponding side of the doorway.

The doorway 34 is much higher than the door 35 and, in fact, said doorway extends entirely to the top of the crib. The door 35 is designed to close the lower portion of the doorway and the upper portion of the said doorway is closed by a number of closure sections which are successively dropped into place when filling the crib and the level of the corn rises. In order to prevent the corn contained within the crib from flowing out through the doorway when the door 35 is swung to open position for the purpose of shoveling out a desired quantity of the corn, a hood is arranged within the crib at the lower portion of the said doorway and this hood comprises spaced sides 40, and a top 41 which extends between the upper ends of the sides 40, and is inclined downwardly from the doorway. The hood is open at that side which is presented toward the interior of the crib and is also open at its opposite side or, in other words, that side which is presented toward the doorway, and the top 41 at the last mentioned side of the hood projects into the doorway, as clearly shown in Fig. 2 of the drawings. In order to reinforce the top 41 and thus enable the same to sustain the weight imposed upon it by the grain within the crib, one or more reinforcing angle bars 42 are secured to the under side of the said top and may extend transversely thereof or at right angles to the position shown in Fig. 2. In like manner the sides 40 of the hood are preferably provided upon their outer faces with reinforcing angle irons 43. The sides 40 are provided with inwardly laterally projecting flanges 44 and secured upon the inner faces of the said sides 40 are inclined ledges 45, the ledges occupying planes parallel to the plane occupied by the inclined top 41. Baffle members 46 are removably disposed within the hood and rest at their ends upon the inclined ledges 45 in the manner shown in Fig. 2 and these baffles while not interfering with the shoveling of the grain from the crib through the doorway, serve to prevent the grain flowing through the doorway and thus becoming wasted.

As before stated, the upper portion of the doorway is designed to be partly or wholly closed by closure sections which are dropped into place in guides located at the opposite sides of the said doorway and these guides are preferably in the nature of U-angle iron uprights 47, the channeled sides of which are presented toward each other. One of the closure sections is clearly illustrated in Fig. 9 of the drawings and these sections are preferably formed of sheet metal and each comprises a body portion 48 and a continuous marginal flange 49 which projects from one face of the said body portion, the flange serving to reinforce the section. In order to permit of ready introduction of the sections into the guides thus provided, the inner wing of one or both of the guides 47 is cut away at one or more points in the length of the guide, as indicated at 50. Also the guides are open at their upper ends so that the sections may also be introduced into the guides through the top of the crib and allowed to drop into place. When placed within the guides the sections, of course, rest one upon another and, as before stated, the sections are added as the level of the grain rises within the crib when the crib is being filled. As before stated, the top 41 of the hood projects into the doorway and between the guides 47 and this projecting portion of the top serves to limit the downward movement of the closure sections in the guides and also as a support for the said sections, which will be apparent by reference to Fig. 2 of the drawings.

In that form of the invention shown in Fig. 7 of the drawings the uprights which correspond to the uprights 10, and which in this figure are indicated by the numeral 51, are so arranged that one wing of each upright will have its edge presented outwardly instead of inwardly as in the case of the said uprights 10 and further, in this form of the invention, the guard corresponding to the guard 33 and indicated by the numeral 52, is arranged inwardly of the lower ends of the uprights instead of extending at the outer sides of the said uprights as in the previously described form of the invention. Otherwise, the modified structure is substantially the same as that previously described.

When it is desired to use the device in storing grain as, for example, wheat and shelled corn, a cylindrical wall section, such as shown in Fig. 8 of the drawings and indicated by the numeral 53, may be employed. This wall section is imperforate and is designed to be disposed within the foraminous wall previously described or to surround the said wall either as found expedient and when in place will, of course, retain grain without leakage.

Having thus described the invention, what is claimed as new is:

1. A corn crib provided in its wall with a doorway, a door for closing the lower portion of the doorway, guides mounted at the opposite sides of the upper portion of the doorway, and closure sections removably disposed one above another with their ends seating in the said guides, one of the said guides having its inwardly presented portion open at an intermediate point in its length for the introduction of the said closure sections.

2. In a structure of the class described, a floor, angle iron uprights supported upon the floor, a foraminous wall extending circumferentially of the crib and resting against the said uprights, means connecting the upper ends of the uprights, plates disposed against the said foraminous wall opposite the uprights, and bolts secured through the said plates and through the wings of the uprights.

3. A corn crib including a wall having an imperforate lower surrounding portion, the wall of the crib having a door opening therein extending into the said portion, a door movable into and out of position to close the door opening, spaced guides upon the said imperforate portion of the wall at one side of the door opening and exterior to the crib, and an auxiliary door slidably mounted at its upper and lower edges in said guides and movable circumferentially of the wall into and out of position to close the lower portion of the said doorway whereby the lower portion of the doorway may be guarded when the main door is open, the said auxiliary door constituting, in its closed position, a continuation of the imperforate portion of the crib wall.

4. A corn crib having a doorway formed in its wall, a door hinged at one side of the doorway and movable into and out of position to close the doorway, upper and lower guide flanges upon the exterior of the wall at the opposite side of the doorway, the lower flange extending across the bottom of the doorway, and an auxiliary imperforate door slidably mounted at its upper and lower edges in said guide flanges and movable to position to close and guard the lower portion of the doorway when the main door is in open position.

5. A corn crib having a doorway formed in its wall, a door hinged at one side of the doorway and movable into and out of position to close the doorway, upper and lower guide flanges upon the exterior of the wall at the opposite side of the doorway, the lower flanges extending across the bottom of the doorway, and an auxiliary imperforate door slidably mounted at its upper and lower edges in said guide flanges and movable to position to close and guard the lower portion of the doorway when the main door is in open position, the said auxiliary door having a projecting portion designed to extend beside the free edge of the main door when the latter is in closed position.

6. In a convertible crib structure of the class described, a foraminous inclosing wall having a door opening therein, and an imperforate shell adapted to be removably fitted into position surrounded by the foraminous wall and having a portion cutaway to communicate with the said door opening.

In testimony whereof we affix our signatures.

COLUMBUS C. CHRISTOPHER. [L. S.]
GILBERT L. KEITH. [L. S.]
JOHN E. ALLSTEADT. [L. S.]
EPHRAIM D. EINSEL. [L. S.]
CHARLES G. PELANDER. [L. S.]

Copies of this patent may be obtained for five cents each, by addressing the "Commissioner of Patents, Washington, D. C."